United States Patent
Hegblom et al.

(10) Patent No.: US 12,489,272 B2
(45) Date of Patent: Dec. 2, 2025

(54) STRAIN POLARIZED VERTICAL CAVITY SURFACE EMITTING LASER

(71) Applicant: Lumentum Operations LLC, San Jose, CA (US)

(72) Inventors: Eric R. Hegblom, Sunnyvale, CA (US); Yeyu Zhu, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 749 days.

(21) Appl. No.: 17/809,948

(22) Filed: Jun. 30, 2022

(65) Prior Publication Data
US 2023/0344198 A1 Oct. 26, 2023

Related U.S. Application Data

(60) Provisional application No. 63/363,588, filed on Apr. 26, 2022.

(51) Int. Cl.
*H01S 5/183* (2006.01)

(52) U.S. Cl.
CPC ...... *H01S 5/18355* (2013.01); *H01S 5/18375* (2013.01)

(58) Field of Classification Search
CPC ............ H01S 5/18355; H01S 5/18375; H01S 5/3201; H01S 5/1833; H01S 5/18344; H01S 5/18394; H01S 5/18347; H01S 5/2063; H01S 2301/176; H01S 5/18313; H01S 5/18361; H01S 5/028; H01S 5/125; H01S 5/2013; H01S 5/24
See application file for complete search history.

(56) References Cited

U.S. PATENT DOCUMENTS

| | | | |
|---|---|---|---|
| 8,000,374 B2 | 8/2011 | Johnson et al. | |
| 9,929,536 B1* | 3/2018 | Lin | H01S 5/18344 |
| 2001/0050934 A1* | 12/2001 | Choquette | H01S 5/1833 |
| | | | 372/50.11 |
| 2011/0027925 A1* | 2/2011 | Ikuta | H01S 5/18311 |
| | | | 372/45.01 |
| 2015/0311673 A1* | 10/2015 | Wang | H01S 5/18305 |
| | | | 372/27 |

(Continued)

OTHER PUBLICATIONS

Ha et al., "Polarisation Anisotropy in Asymmetric Oxide Aperture VCSELs," Electronics Letters, vol. 34, No. 14, Jul. 1998 (Year: 1998).*

(Continued)

*Primary Examiner* — Xinning(Tom) Niu
(74) *Attorney, Agent, or Firm* — Harrity & Harrity, LLP

(57) ABSTRACT

In some implementations, an emitter device includes a substrate layer and epitaxial layers on the substrate layer. The epitaxial layers may include a first mirror, a second mirror, and an active layer between the first mirror and the second mirror. The epitaxial layers may include at least one oxidation layer including a first oxidized region and a second oxidized region separate from the first oxidized region. The first oxidized region and the second oxidized region may be configured to provide a strain on the epitaxial layers that is radially asymmetric. The epitaxial layers may include a set of oxidation trenches in the set of epitaxial layers to expose the at least one oxidation layer.

20 Claims, 6 Drawing Sheets

(56) References Cited

U.S. PATENT DOCUMENTS

2020/0169062 A1* 5/2020 Yuen ................ H01S 5/18388
2022/0311212 A1* 9/2022 Tu ..................... H01S 5/18347

OTHER PUBLICATIONS

Coldren et al., "Diode Lasers and Photonic Integrated Circuits," Wiley-Interscience Publication, Chapter 4, 1995, 307 Pages.

Jenohara et al., "Polarization-Controlled 850-nm-Wavelength Vertical-Cavity Surface-Emitting Lasers Grown on (311) B Substrates by Metal-Organic Chemical Vapor Deposition," IEEE Journal of Selected Topics in Quantum Electronics, vol. 5, No. 3, May/Jun. 1999, 9 Pages.

Numai et al., "Control of Light-Output Polarization for Surface-Emitting-Laser Type Device by Strained Active Layer Grown on Misoriented Substrate," IEEE Journal of Quantum Electronics, vol. 31, No. 4, Apr. 1995, 7 Pages.

Fiedler et al., "Stable Linearly Polarized Light Emission from VCSELs with Oxidized Elliptical Current Aperture," IEEE International Semiconductor Laser Conference, Oct. 1996, M3.3, 2 Pages.

Choquette et al., "Control of Vertical-Cavity Laser Polarization with Anisotropic Transverse Cavity Geometries," IEEE Photonics Technology Letters, vol. 6, No. 1, Jan. 1994, 3 Pages.

Debernardi et al., "Reliable Polarization Control of VCSELs Through Monolithically Integrated Surface Gratings: A Comparative Theoretical and Experimental Study," IEEE Journal of Selected Topics in Quantum Electronics, vol. 11, No. 1, Jan./Feb. 2005, 10 Pages.

Twesten et al., "Microstructure and interface properties of laterally oxidized AlxGa1-xAs," SPIE Photonics West 1997, vol. 2003, 7 Pages.

E.R. Hegblom, "Engineering Oxide Apertures in Vertical Cavity Lasers", University of California, Santa Barbara, Dissertation, ECE-Technical Report #99-03, 1999, Chapter 7, 12 Pages.

Chang-Hasnain et al., "High-Contrast Grating VCSELs," IEEE Journal of Selected Topics in Quantum Electronics, vol. 15, No. 3, May/Jun. 2009, 10 Pages.

* cited by examiner

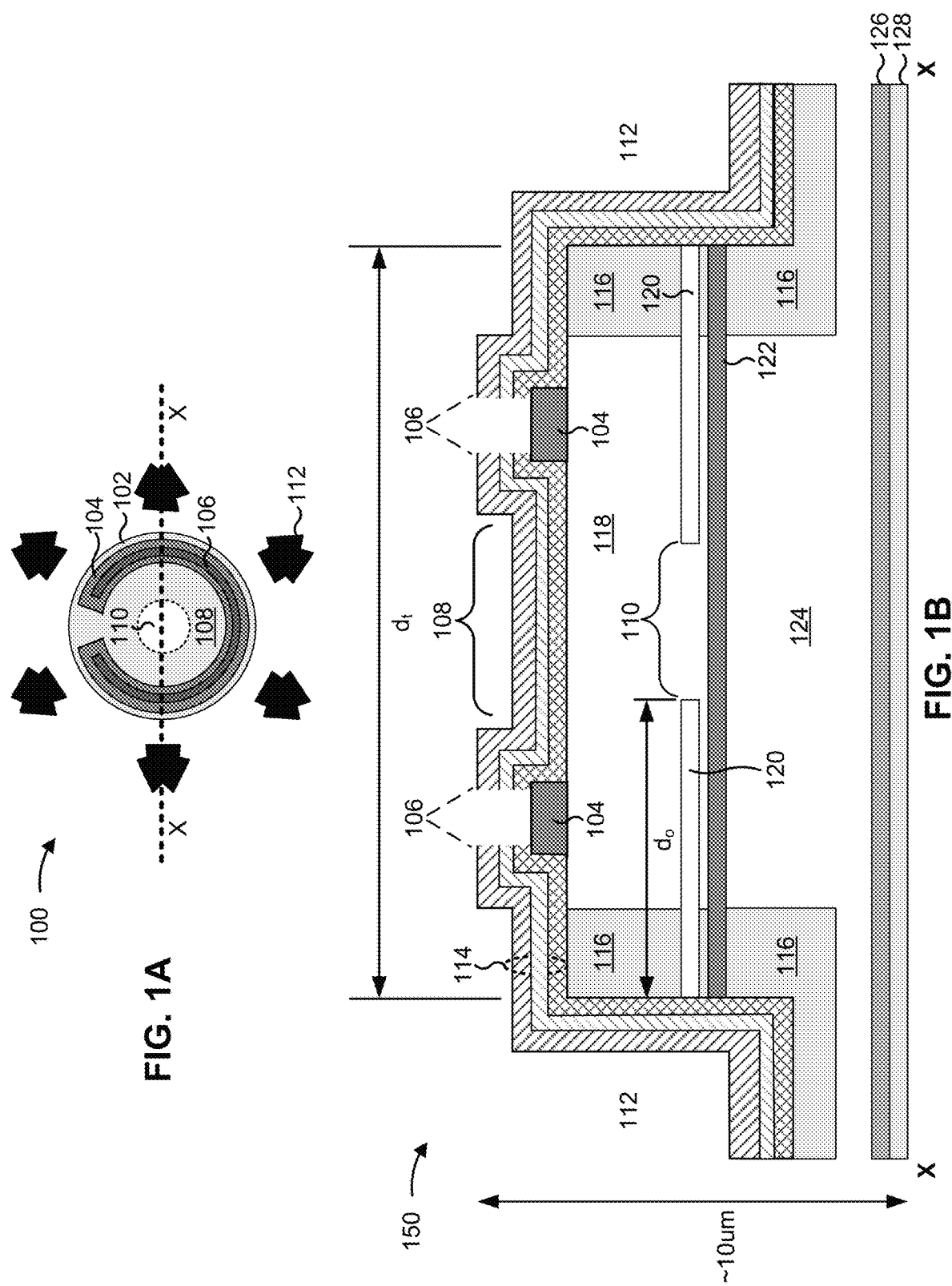

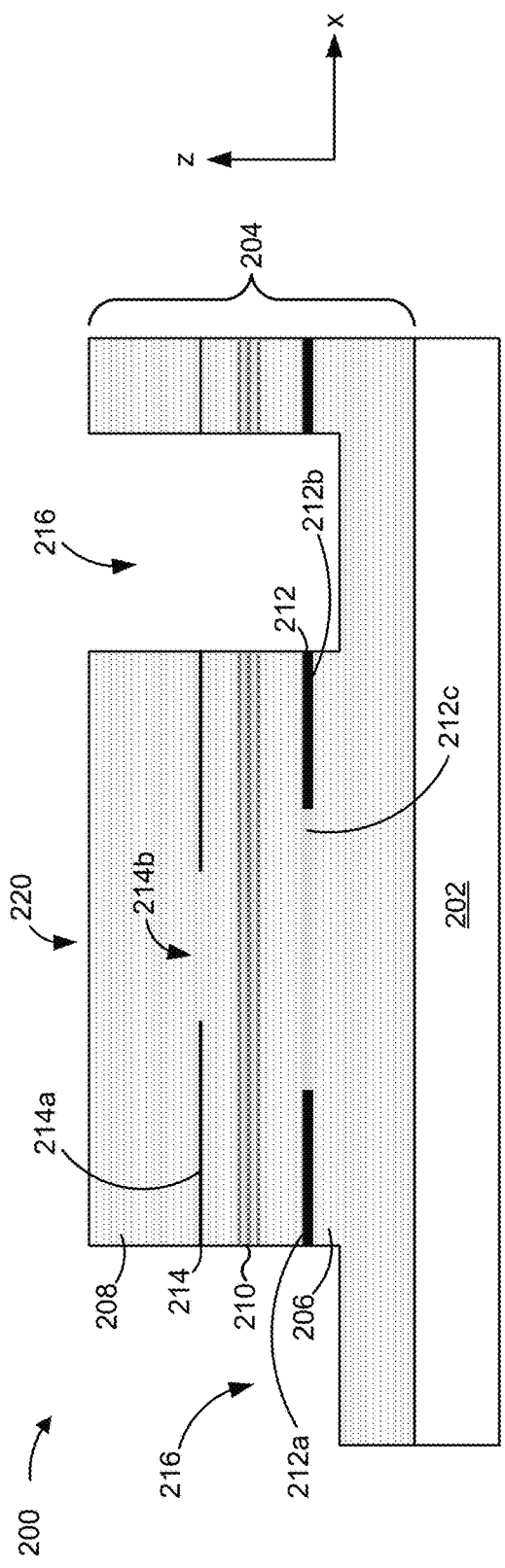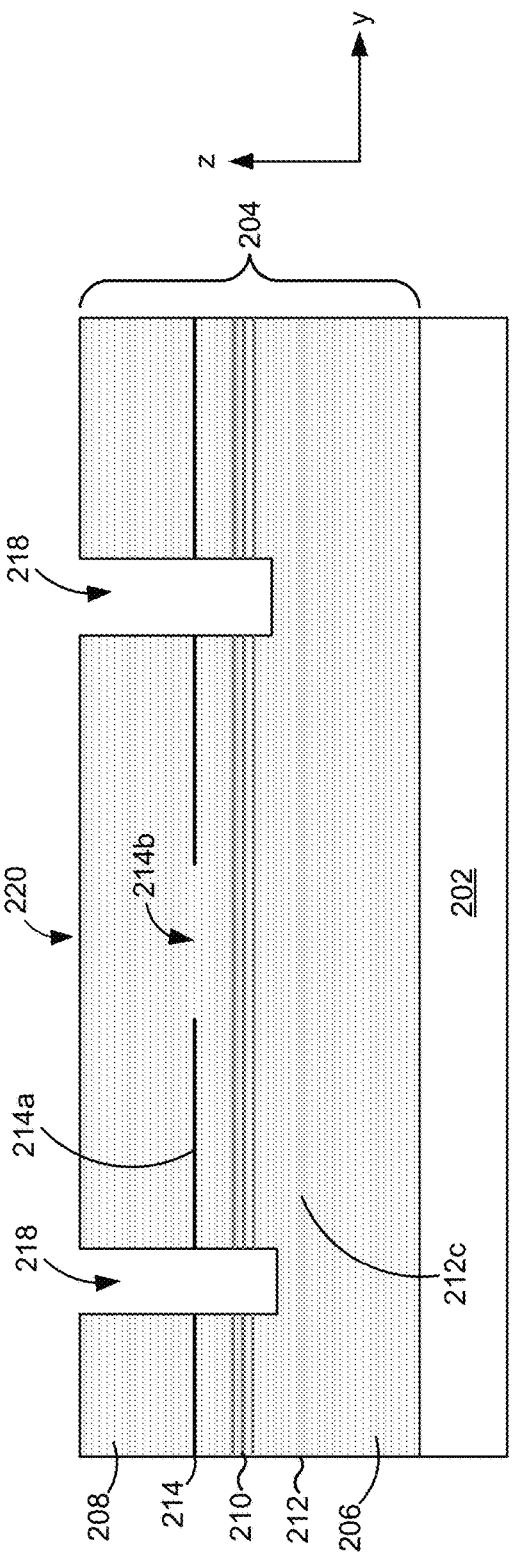
FIG. 2B
FIG. 2C

STRAIN POLARIZED VERTICAL CAVITY SURFACE EMITTING LASER

CROSS-REFERENCE TO RELATED APPLICATION

This Patent Application claims priority to U.S. Provisional Patent Application No. 63/363,588, filed on Apr. 26, 2022, and entitled "DUAL OXIDE, STRAIN POLARIZED VERTICAL CAVITY SURFACE EMITTING LASER." The disclosure of the prior application is considered part of and is incorporated by reference into this patent application.

TECHNICAL FIELD

The present disclosure relates generally to vertical cavity surface emitting lasers (VCSELs) and to a strain polarized VCSEL.

BACKGROUND

A vertical-emitting device, such as a VCSEL, may include a laser, an optical transmitter, or the like, in which a beam is emitted in a direction perpendicular to a surface of a substrate (e.g., vertically from a surface of a semiconductor wafer). Multiple vertical-emitting devices may be arranged in one or more emitter arrays (e.g., VCSEL arrays) on a common substrate.

SUMMARY

In some implementations, a VCSEL includes a substrate layer and epitaxial layers on the substrate layer. The epitaxial layers may include a first mirror, a second mirror, and an active layer between the first mirror and the second mirror. The epitaxial layers may include at least one first oxidation layer including a first oxidized region and a second oxidized region separate from the first oxidized region. The first oxidized region and the second oxidized region may be respectively on opposing sides of an emission region of the epitaxial layers to provide a strain on the epitaxial layers that is radially asymmetric. The epitaxial layers may include a second oxidation layer including a third oxidized region that encircles an oxide aperture. The epitaxial layers may include a first set of oxidation trenches in the set of epitaxial layers to expose the first oxidation layer and the second oxidation layer, and a second set of oxidation trenches in the set of epitaxial layers to expose the second oxidation layer without exposing the first oxidation layer.

In some implementations, an emitter device includes a substrate layer and epitaxial layers on the substrate layer. The epitaxial layers may include a first mirror, a second mirror, and an active layer between the first mirror and the second mirror. The epitaxial layers may include at least one oxidation layer including a first oxidized region and a second oxidized region separate from the first oxidized region. The first oxidized region and the second oxidized region may be configured to provide a strain on the epitaxial layers that is radially asymmetric. The epitaxial layers may include a set of oxidation trenches in the set of epitaxial layers to expose the at least one oxidation layer.

In some implementations, a method includes forming, on a substrate layer, epitaxial layers including a first mirror, a second mirror, an active region between the first mirror and the second mirror, at least one first oxidation layer, and a second oxidation layer. The method may include etching, in a single etching step, a first set of oxidation trenches and a second set of oxidation trenches, where the first set of oxidation trenches expose the at least one first oxidation layer and the second oxidation layer, and the second set of oxidation trenches expose the second oxidation layer without exposing the at least one first oxidation layer. The method may include oxidizing, in a single oxidizing step, the at least one first oxidation layer and the second oxidation layer. Oxidizing the at least one first oxidation layer may form a first oxidized region and a second oxidized region, separate from the first oxidized region, to cause a strain on the epitaxial layers that is radially asymmetric, and oxidizing the second oxidation layer may form a third oxidized region that encircles an oxide aperture.

BRIEF DESCRIPTION OF THE DRAWINGS

FIGS. 1A and 1B are diagrams illustrating a top view of an example emitter, and a cross-sectional view of the example emitter along line X-X, respectively.

FIGS. 2A-2C are diagrams illustrating a top view of an example emitter device, a cross-sectional view of the example emitter device along line X-X, and a cross-sectional view of the example emitter device along line Y-Y, respectively.

DETAILED DESCRIPTION

Figure 2A:
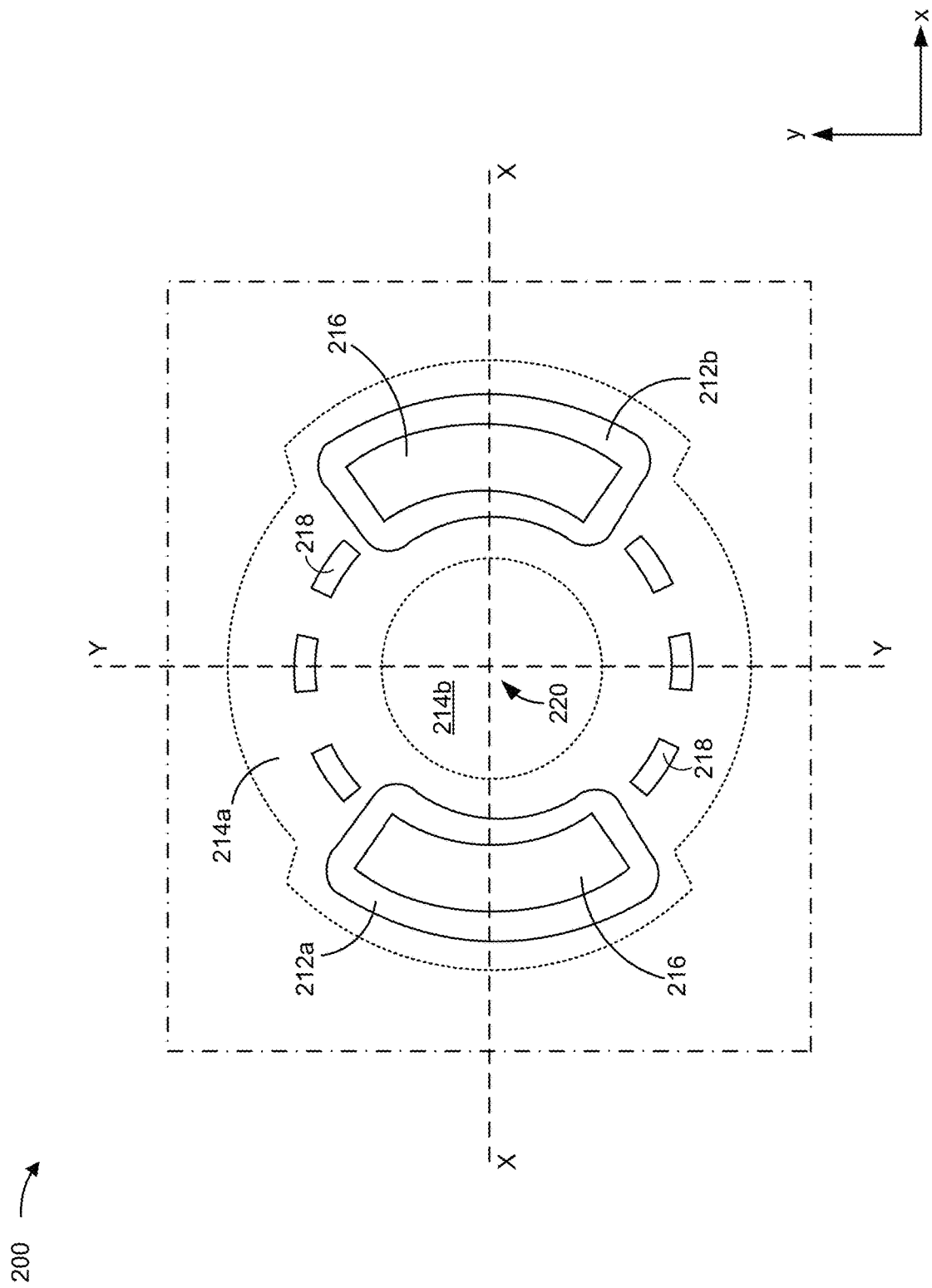

The following detailed description of example implementations refers to the accompanying drawings. The same reference numbers in different drawings may identify the same or similar elements. In the following detailed description, the term emitter or vertical cavity surface emitting laser (VCSEL) is used synonymously for a single emitter or VCSEL or an array of emitters or VCSELs unless stated otherwise. Furthermore, while layers are described as being associated with or used by a single emitter or VCSEL, in some implementations, a layer may be shared by emitters or VCSELs in an emitter or VCSEL array.

VCSELs are commonly circular, or near-circular, and do not have a strong preference direction for light polarization. In some cases, light emitted from a VCSEL may jump between polarization directions as a bias current of the VCSEL changes. However, polarization control may be desirable for various applications that use VCSELs. For example, some three-dimensional (3D) sensing applications require polarization-sensitive optics, and these applications may be associated with high loss in some instances for one polarization. Moreover, some advanced optics may be able to take advantage of an ability to adjust the polarization for adjacent emitters.

Some polarization approaches are challenged by either a narrow process window, insufficient polarization control, or degradation of output power. For example, one approach uses an off-axis substrate (e.g., mis-cut or cut far off the crystalline axis) that may promote a single polarization. However, the polarization direction will be similar for all emitters on a wafer and in some cases may be difficult to grow for mass production. Another approach uses asymmetric emitter shapes, which may be effective for a small size emitter (e.g., 3×5 micrometers (μm)). However, in some applications, circular modes and/or larger emitter sizes are needed.

An additional approach uses surface gratings. The production of surface gratings requires high-resolution photolithography and tightly controlled etching. The process window for these is narrow in order to avoid a significant penalty to optical output power or a low extinction ratio. A further approach uses high contrast gratings. VCSELs with high contrast gratings are strongly polarized, but are difficult to fabricate and require a suspended structure that is large. Moreover, a high-index contrast is susceptible to scattering losses from etching imperfections, and high efficiency is difficult to achieve.

Some implementations described herein provide an emitter device (e.g., a VCSEL) configured to lase primarily in one polarization as a result of one or more oxidation layers that include oxidized regions that flank opposite sides of an emission region of the emitter device in a non-radially symmetric manner to induce strain primarily along one axis (e.g., asymmetric strain). The emitter device may also include, in addition to the oxidation layer(s) that induce lateral strain, one or more other oxidation layers to provide current and optical confinement. These oxidation layers may include an oxidized region that completely surrounds the emission region. To achieve such oxidized regions, epitaxial layers of the emitter device may include a first set of oxidation trenches to expose, for oxidation, the strain-inducing oxidation layer(s) and the confinement oxidation layer(s), and a second set of oxidation trenches to expose, for oxidation, only the confinement oxidation layer(s).

In some cases, the asymmetric strain from the oxidized epitaxial layers may cause bowing across the emitter device. For example, when wet thermal oxidation of an AlAs layer occurs, the aluminum will stay in the layer while oxygen (and some hydrogen) replaces the arsenic, which likely leaves in the form of $AsH_3$ gas. For the same moles of aluminum, pure crystalline AlAs occupies a volume (27.4 $cm^3$ per mole Al) that is more than double pure $Al_2O_3$ (12.9 $cm^3$ per mole Al). In other words, the oxidation may cause oxidized portions of the layer to shrink, while other portions may include aluminum that remains bonded to surrounding arsenic. These bonds put strain on the semiconductor layers above and below the layer, as well as between oxidation fronts.

The strain may influence gain properties of an active region of the emitter device. For example, bi-axial strain of a few percent may reduce the threshold carrier density and make a considerable difference in gain at a fixed carrier density. Moreover, strain along one axis (e.g., one of an x-axis or a y-axis) creates a difference in the gain between the x-axis and the y-axis of the emitter device, thereby reducing the threshold of one polarization relative to the orthogonal polarization and suppressing lasing of the orthogonally polarized light. Additionally, birefringence induced from the strain may help lock in one polarization direction, in a manner similar to polarization-maintaining optical fibers that employ stress rods.

In this way, the emitter device may emit light that is polarized without the drawbacks associated with other polarization approaches described above. Moreover, the emitter device may be relatively simple to manufacture, particularly because the sets of oxidation trenches can be etched in a single etching procedure and the strain-inducing oxidation layer(s) and the confinement oxidation layer(s) can be oxidized in a single oxidation step.

FIGS. 1A and 1B are diagrams depicting a top-view of an example emitter 100 and a cross-sectional view 150 of the example emitter 100 along line X-X, respectively. As shown in FIG. 1A, emitter 100 may include a set of emitter layers constructed in an emitter architecture. In some implementations, emitter 100 may correspond to one or more vertical-emitting devices described herein.

As shown in FIG. 1A, emitter 100 may include an implant protection layer 102 that is circular in shape in this example. In some implementations, implant protection layer 102 may have another shape, such as an elliptical shape, a polygonal shape, or the like. Implant protection layer 102 is defined based on a space between sections of implant material (not shown) included in emitter 100.

As shown by the medium gray and dark gray areas in FIG. 1A, emitter 100 includes an ohmic metal layer 104 (e.g., a P-Ohmic metal layer or an N-Ohmic metal layer) that is constructed in a partial ring-shape (e.g., with an inner radius and an outer radius). The medium gray area shows an area of ohmic metal layer 104 covered by a protective layer (e.g. a dielectric layer or a passivation layer) of emitter 100 and the dark gray area shows an area of ohmic metal layer 104 exposed by via 106, described below. As shown, ohmic metal layer 104 overlaps with implant protection layer 102. Such a configuration may be used, for example, in the case of a P-up/top-emitting emitter 100. In the case of a bottom-emitting emitter 100, the configuration may be adjusted as needed.

Not shown in FIG. 1A, emitter 100 includes a protective layer in which via 106 is formed (e.g., etched). The dark gray area shows an area of ohmic metal layer 104 that is exposed by via 106 (e.g., the shape of the dark gray area may be a result of the shape of via 106) while the medium gray area shows an area of ohmic metal layer 104 that is covered by some protective layer. The protective layer may cover all of the emitter other than the vias. As shown, via 106 is formed in a partial ring-shape (e.g., similar to ohmic metal layer 104) and is formed over ohmic metal layer 104 such that metallization on the protection layer contacts ohmic metal layer 104. In some implementations, via 106 and/or ohmic metal layer 104 may be formed in another shape, such as a full ring-shape or a split ring-shape.

As further shown, emitter 100 includes an optical aperture 108 in a portion of emitter 100 within the inner radius of the partial ring-shape of ohmic metal layer 104. Emitter 100 emits a laser beam via optical aperture 108. As further shown, emitter 100 also includes a current confinement aperture 110 (e.g., an oxide aperture formed by an oxidation layer of emitter 100 (not shown)). Current confinement aperture 110 is formed below optical aperture 108.

As further shown in FIG. 1A, emitter 100 includes a set of trenches 112 (e.g., oxidation trenches) that are spaced (e.g., equally, unequally) around a circumference of implant protection layer 102. How closely trenches 112 can be positioned relative to the optical aperture 108 is dependent on the application, and is typically limited by implant protection layer 102, ohmic metal layer 104, via 106, and manufacturing tolerances.

The number and arrangement of layers shown in FIG. 1A are provided as an example. In practice, emitter 100 may include additional layers, fewer layers, different layers, or differently arranged layers than those shown in FIG. 1A. For example, while emitter 100 includes a set of six trenches 112, in practice, other configurations are possible, such as a compact emitter that includes five trenches 112, seven trenches 112, or another quantity of trenches. In some implementations, trench 112 may encircle emitter 100 to form a mesa structure $d_r$. As another example, while emitter 100 is a circular emitter design, in practice, other designs may be used, such as a rectangular emitter, a hexagonal emitter, an elliptical emitter, or the like. Additionally, or alternatively, a set of layers (e.g., one or more layers) of emitter 100 may perform one or more functions described as being performed by another set of layers of emitter 100, respectively.

Notably, while the design of emitter 100 is described as including a VCSEL, other implementations are possible. For example, the design of emitter 100 may apply in the context of another type of optical device, such as a light emitting diode (LED), or another type of vertical emitting (e.g., top emitting or bottom emitting) optical device. Additionally, the design of emitter 100 may apply to emitters of any wavelength, power level, and/or emission profile. In other words, emitter 100 is not particular to an emitter with a given performance characteristic.

As shown in FIG. 1B, the example cross-sectional view may represent a cross-section of emitter 100 that passes through, or between, a pair of trenches 112 (e.g., as shown by the line labeled "X-X" in FIG. 1A). As shown, emitter 100 may include a backside cathode layer 128, a substrate layer 126, a bottom mirror 124, an active region 122, an oxidation layer 120, a top mirror 118, an implant isolation material 116, a protective layer 114 (e.g. a dielectric passivation/mirror layer), and an ohmic metal layer 104. As shown, emitter 100 may have, for example, a total height that is approximately 10 micrometers ($\mu m$).

Backside cathode layer 128 may include a layer that makes electrical contact with substrate layer 126. For example, backside cathode layer 128 may include an annealed metallization layer, such as an AuGeNi layer, a PdGeAu layer, or the like.

Substrate layer 126 may include a base substrate layer upon which epitaxial layers are grown. For example, substrate layer 126 may include a semiconductor layer, such as a GaAs layer, an InP layer, and/or another type of semiconductor layer.

Bottom mirror 124 may include a bottom reflector layer of emitter 100. For example, bottom mirror 124 may include a distributed Bragg reflector (DBR).

Active region 122 may include a layer that confines electrons and defines an emission wavelength of emitter 100. For example, active region 122 may be a quantum well.

Oxidation layer 120 may include an oxide layer that provides optical and electrical confinement of emitter 100. In some implementations, oxidation layer 120 may be formed as a result of wet oxidation of an epitaxial layer. For example, oxidation layer 120 may be an $Al_2O_3$ layer formed as a result of oxidation of an AlAs or AlGaAs layer. Trenches 112 may include openings that allow oxygen (e.g., dry oxygen, wet oxygen) to access the epitaxial layer from which oxidation layer 120 is formed.

Current confinement aperture 110 may include an optically active aperture defined by oxidation layer 120. A size of current confinement aperture 110 may range, for example, from approximately 4 $\mu m$ to approximately 20 $\mu m$. In some implementations, a size of current confinement aperture 110 may depend on a distance between trenches 112 that surround emitter 100. For example, trenches 112 may be etched to expose the epitaxial layer from which oxidation layer 120 is formed. Here, before protective layer 114 is formed (e.g., deposited), oxidation of the epitaxial layer may occur for a particular distance (e.g., identified as do in FIG. 1B) toward a center of emitter 100, thereby forming oxidation layer 120 and current confinement aperture 110. In some implementations, current confinement aperture 110 may include an oxide aperture. Additionally, or alternatively, current confinement aperture 110 may include an aperture associated with another type of current confinement technique, such as an etched mesa, a region without ion implantation, lithographically defined intra-cavity mesa and regrowth, or the like.

Top mirror 118 may include a top reflector layer of emitter 100. For example, top mirror 118 may include a DBR.

Implant isolation material 116 may include a material that provides electrical isolation. For example, implant isolation material 116 may include an ion implanted material, such as a hydrogen/proton implanted material or a similar implanted element to reduce conductivity. In some implementations, implant isolation material 116 may define implant protection layer 102.

Protective layer 114 may include a layer that acts as a protective passivation layer, and which may act as an additional DBR. For example, protective layer 114 may include one or more sub-layers (e.g., a dielectric passivation layer and/or a mirror layer, a $SiO_2$ layer, a $Si_3N_4$ layer, an $Al_2O_3$ layer, or other layers) deposited (e.g., by chemical vapor deposition, atomic layer deposition, or other techniques) on one or more other layers of emitter 100.

As shown, protective layer 114 may include one or more vias 106 that provide electrical access to ohmic metal layer 104. For example, via 106 may be formed as an etched portion of protective layer 114 or a lifted-off section of protective layer 114. Optical aperture 108 may include a portion of protective layer 114 over current confinement aperture 110 through which light may be emitted.

Ohmic metal layer 104 may include a layer that makes electrical contact through which electrical current may flow. For example, ohmic metal layer 104 may include a Ti and Au layer, a Ti and Pt layer and/or an Au layer, or the like, through which electrical current may flow (e.g., through a bondpad (not shown) that contacts ohmic metal layer 104 through via 106). Ohmic metal layer 104 may be P-ohmic, N-ohmic, or other forms known in the art. Selection of a particular type of ohmic metal layer 104 may depend on the architecture of the emitters and is well within the knowledge of a person skilled in the art. Ohmic metal layer 104 may provide ohmic contact between a metal and a semiconductor and/or may provide a non-rectifying electrical junction and/or may provide a low-resistance contact. In some implementations, emitter 100 may be manufactured using a series of steps. For example, bottom mirror 124, active region 122, oxidation layer 120, and top mirror 118 may be epitaxially grown on substrate layer 126, after which ohmic metal layer 104 may be deposited on top mirror 118. Next, trenches 112 may be etched to expose oxidation layer 120 for oxidation. Implant isolation material 116 may be created via ion implantation, after which protective layer 114 may be deposited. Via 106 may be etched in protective layer 114 (e.g., to expose ohmic metal layer 104 for contact). Plating, seeding, and etching may be performed, after which substrate layer 126 may be thinned and/or lapped to a target thickness. Finally, backside cathode layer 128 may be deposited on a bottom side of substrate layer 126.

The number, arrangement, thicknesses, order, symmetry, or the like, of layers shown in FIG. 1B is provided as an example. In practice, emitter 100 may include additional layers, fewer layers, different layers, differently constructed layers, or differently arranged layers than those shown in FIG. 1B. Additionally, or alternatively, a set of layers (e.g., one or more layers) of emitter 100 may perform one or more functions described as being performed by another set of layers of emitter 100 and any layer may comprise more than one layer.

FIGS. 2A-2C are diagrams illustrating a top view of an example emitter device 200, a cross-sectional view of the example emitter device 200 along line X-X, and a cross-sectional view of the example emitter device 200 along line Y-Y, respectively. As shown, the emitter device 200 may include a substrate layer 202 and epitaxial layers 204 disposed on (e.g., formed on) the substrate layer 202, in a similar manner as described in connection with FIGS. 1A and 1B. The epitaxial layers 204 may include a first mirror 206 (e.g., a first DBR), a second mirror 208 (e.g., a second DBR), and an active region 210 (e.g., a quantum well) between the first mirror 206 and the second mirror 208. The active region 210 may include an active layer or multiple active layers with one or more tunnel junctions therebetween. The emitter device 200 may also include an anode contact (e.g., contact metal), a cathode contact, a dielectric layer on an output facet of the emitter device 200, ion implantation to provide electrical isolation, and/or a metal plating, in similar manner as described in connection with FIGS. 1A and 1B.

The epitaxial layers 204 may include a first oxidation layer 212 (e.g., at least one first oxidation layer 212) to induce a particular strain in the epitaxial layers 204. In some implementations, the first oxidation layer 212 may include multiple first oxidation layers 212. Unless otherwise noted, references to the first oxidation layer 212 herein may refer to a single first oxidation layer 212 or multiple first oxidation layers 212. In some implementations, the epitaxial layers 204 may include a second oxidation layer 214 (e.g., one or more oxidation layers) to provide optical and current confinement. The active region 210 may be between the first oxidation layer 212 and the second oxidation layer 214. In some implementations, the first oxidation layer 212 may be deeper in the epitaxial layers 204 than the second oxidation layer 214. For example, the first oxidation layer 212 may be in the first mirror 206, and the second oxidation layer 214 may be in the second mirror 208.

The epitaxial layers 204 may include a first set of oxidation trenches 216 (e.g., one or more oxidation trenches 216) and a second set of oxidation trenches 218 (e.g., one or more oxidation trenches 218) that are etched down into the epitaxial layers 204. The first set of oxidation trenches 216 and the second set of oxidation trenches 218 may be arranged radially around an emission region 220 of the emitter device 200 (e.g., a center of the emitter device 200 relative to an emission direction of the emitter device 200). As shown in FIG. 2A, the first set of oxidation trenches 216 includes two oxidation trenches 216, and the second set of oxidation trenches 218 includes six oxidation trenches 218. The quantity of oxidation trenches 216, 218 shown is an example, and the emitter device 200 may include a different quantity of oxidation trenches 216 and/or oxidation trenches 218. For example, an oxidation trench 216 may be segmented into multiple (e.g., two, three, four, etc.) smaller oxidation trenches 216. As another example, an oxidation trench 218 may be segmented into multiple (e.g., two, three, four, etc.) smaller oxidation trenches 218. As a further example, multiple (e.g., two or three) oxidation trenches 218 may be combined into a single oxidation trench 218.

The first set of oxidation trenches 216 may be configured to expose, and cause oxidation of, the first oxidation layer 212 and the second oxidation layer 214. For example, the first set of oxidation trenches 216 may extend into the epitaxial layers 204 to a depth of the first oxidation layer 212 (e.g., a depth at or beyond the first oxidation layer 212). Thus, the first set of oxidation trenches 216 may provide oxidation of the first oxidation layer 212 and the second oxidation layer 214. The second set of oxidation trenches 218 may be configured to expose, and cause oxidation of, the second oxidation layer 214 without exposing, and causing oxidation of, the first oxidation layer 212. For example, the second set of oxidation trenches 218 may extend into the epitaxial layers 204 to a depth between the first oxidation layer 212 and the second oxidation layer 214. In other words, the first set of oxidation trenches 216 may extend deeper into the epitaxial layers 204 than a depth at which the second set of oxidation trenches 218 extend into the epitaxial layers 204. Thus, the second set of oxidation trenches 218 may provide oxidation of the second oxidation layer 214 without providing oxidation of the first oxidation layer 212.

The first set of oxidation trenches 216 may have greater widths than widths of the second set of oxidation trenches 218. That is, each oxidation trench 216 of the first set of oxidation trenches 216 may have a greater width than a width of each oxidation trench 218 of the second set of oxidation trenches 218. A "width" of an oxidation trench may refer to a dimension of the oxidation trench that extends radially from the emission region 220 of the emitter device 200. In this way, the first set of oxidation trenches 216 and the second set of oxidation trenches 218 may be etched as part of a single etching step (e.g., the first set of oxidation trenches 216 and the second set of oxidation trenches 218 may be etched concurrently during the same etching operation). In some implementations, widths of the first set of oxidation trenches 216 may be the same as widths of the second set of oxidation trenches 218. Here, the first set of oxidation trenches 216 and the second set of oxidation trenches 218 may be etched in different etching steps.

In some implementations, one or more first oxidation trenches 216 may be in a first quadrant of the epitaxial layers 204, and one or more second oxidation trenches 218 may be in a second quadrant of the epitaxial layers 204 opposite the first quadrant. Moreover, one or more first oxidation trenches 216 may be in a third quadrant of the epitaxial layers, adjacent to the first quadrant and the second quadrant, and one or more second oxidation trenches 218 may be in a fourth quadrant of the epitaxial layers 204 adjacent to the first quadrant and the second quadrant and opposite the third quadrant. In other words, one or more oxidation trenches 216 may be between one or more oxidation trenches 218 radially around the emission region 220 of the emitter device 200.

The configuration of the first set of oxidation trenches 216 and the second set of oxidation trenches 218, described herein, may cause oxidation of the first oxidation layer 212 and the second oxidation layer 214 in particular patterns. In particular, the first oxidation layer 212 may include a first oxidized region 212a and a second oxidized region 212b separate from the first oxidized region 212a (e.g., the first oxidized region 212a and the second oxidized region 212b are not contiguous). The first oxidized region 212a and the second oxidized region 212b may be in the shape of ring segments (i.e., segments of a ring that encompass less than the whole ring) or another stripe-like shape that does not enclose an inner unoxidized area. Moreover, the first oxidation layer 212 may lack any contiguous oxidized region that completely encircles the emission region 220 of the emitter device 200. In other words, oxidized regions of the first oxidation layer 212 only partially surround the emission region 220 of the emitter device 200. Example boundaries of the first oxidized region 212a and the second oxidized region 212b are shown by solid line in FIG. 1A.

In some implementations, the first oxidation layer 212 may be a single first oxidation layer 212 having the first oxidized region 212a, the second oxidized region 212b, and an unoxidized region 212c that separates the first oxidized region 212a and the second oxidized region 212b (as shown in FIG. 2B). The unoxidized region 212c may be a region that is predominantly unoxidized, but may nevertheless include a small amount of oxidation (e.g., less than 5% by volume oxidation). In some implementations, the first oxidation layer 212 may be multiple (e.g., two) first oxidation layers 212 that respectively have the first oxidized region 212a and the second oxidized region 212b. For example, a first layer of the multiple first oxidation layers 212 may include the first oxidized region 212a with a remaining portion of the first layer being an unoxidized region (e.g., that may include a small amount of oxidation, as described above), and a second layer of the multiple first oxidation layers 212 may include the second oxidized region 212b with a remaining portion of the second layer being an unoxidized region (e.g., that may include a small amount of oxidation, as described above).

The first oxidized region 212a and the second oxidized region 212b may be configured to provide a strain on the epitaxial layers 204 that is radially asymmetric (e.g., in an area of the epitaxial layers 204 that extends radially from the emission region 220 to the oxidation trenches 216, 218). "Radially asymmetric" strain may refer to a strain profile where a strain in one radial section (e.g., slice) of the epitaxial layers 204 is different from a strain in another radial section of the epitaxial layers 204. In some implementations, the first oxidized region 212a and the second oxidized region 212b may be respectively on opposing sides of the epitaxial layers 204 (e.g., relative to the emission region 220 of the emitter device 200). In particular, the first oxidized region 212a and the second oxidized region 212b may be located along a first axis (e.g., the x-axis shown in FIG. 2A) orthogonal to an emission direction of the emitter device 200 (which is along the z-axis in FIGS. 2B and 2C). The first oxidation layer 212 may lack an oxidized region located along a second axis (e.g., the y-axis shown in FIG. 2A) orthogonal to the first axis and the emission direction. Moreover, the strain on the epitaxial layers 204 is greater along the first axis (e.g., the x-axis) than along the second axis (e.g., the y-axis). For example, strain induced on the epitaxial layers 204 by the first oxidation layer 212 is primarily along the x-axis shown in FIGS. 2A and 2B.

The radially asymmetric strain provided by the first oxidized region 212a and the second oxidized region 212b may provide an area of greater strain that extends over the emission region 220. Moreover, the epitaxial layers 204 may be radially asymmetrically bowed (e.g., convex) in accordance with the radially asymmetric strain (e.g., bowed portion(s) may be associated with locations in the epitaxial layers 204 in which strain is greater). For example, a top surface of the emitter device 200 may be bowed. Thus, the radially asymmetric strain on the epitaxial layers 204 (and resulting radially asymmetric bowing) may induce a particular polarization for light emission of the emitter device 200 (e.g., lasing of the emitter device 200 may be in a single polarization state). For example, the radially asymmetric strain may partially or substantially polarize output light of the emitter device 200 in one direction.

The second oxidation layer 214 may include an oxidized region 214a (e.g., a third oxidized region) that encircles (e.g., surrounds) an oxide aperture 214b (e.g., an unoxidized region). That is, the oxidized region 214a may be a contiguous oxidized region that completely surrounds the emission region 220 of the emitter device 200. For example, the oxidized region 214a may be in the shape of a ring or another shape that encloses an inner unoxidized area. Thus, the oxidized region 214a of the second oxidation layer 214 may be substantially radially symmetric in an area of the epitaxial layers 204 that extends radially from the emission region 220 to the oxidation trenches 216, 218. The oxide aperture 214b defined by the oxidized region 214a may be circular (e.g., approximately circular), as shown in FIG. 2A, or may be a different shape, such as elliptical. In some implementations, the oxidized region 214a may be radially asymmetric to contribute to the radially asymmetric strain on the epitaxial layers 204. An example boundary of the oxidized region 214a is shown by dashed line in FIG. 2A.

In some implementations, the first oxidation layer 212 may have a greater thickness than a thickness of the second oxidation layer 214. For example, a thickness of the first oxidation layer 212 may be a quarter wave thickness or greater. In this way, oxidization of the first oxidation layer 212 may induce the radially asymmetric strain described herein. The first oxidation layer 212 and the second oxidation layer 214 may be composed of aluminum gallium arsenide (AlGaAs), aluminum arsenide (AlAs), or another semiconductor material. The first oxidation layer 212 and the second oxidation layer 214 may both have a high aluminum content (e.g., greater than 95% or greater than 98%). However, the first oxidation layer 212 may have a lower aluminum content (e.g., a lower aluminum mole fraction) than an aluminum content (e.g., an aluminum mole fraction) of the second oxidation layer 214. In this way, the oxidized region 214a of the second oxidation layer 214 may extend further inward toward the center of the epitaxial layers 204 than the first oxidized region 212a and the second oxidized region 212b of the first oxidation layer 212 (as shown in FIGS. 2A and 2B). Accordingly, an extent of optical and current confinement for the emitter device 200 may be provided by the second oxidation layer 214, and the first oxidation layer 212 may not affect optical mode shape.

In this way, the first oxidation layer 212 may provide radially asymmetric strain in the epitaxial layers, thereby causing radially asymmetric bowing of the epitaxial layers that extends across the emission region 220. Accordingly, light emission of the emitter device 200 may be in a single polarization state as a result of the radially asymmetric strain.

As indicated above, FIGS. 2A-2C are provided as examples. Other examples may differ from what is described with regard to FIGS. 2A-2C.

Figure 3:
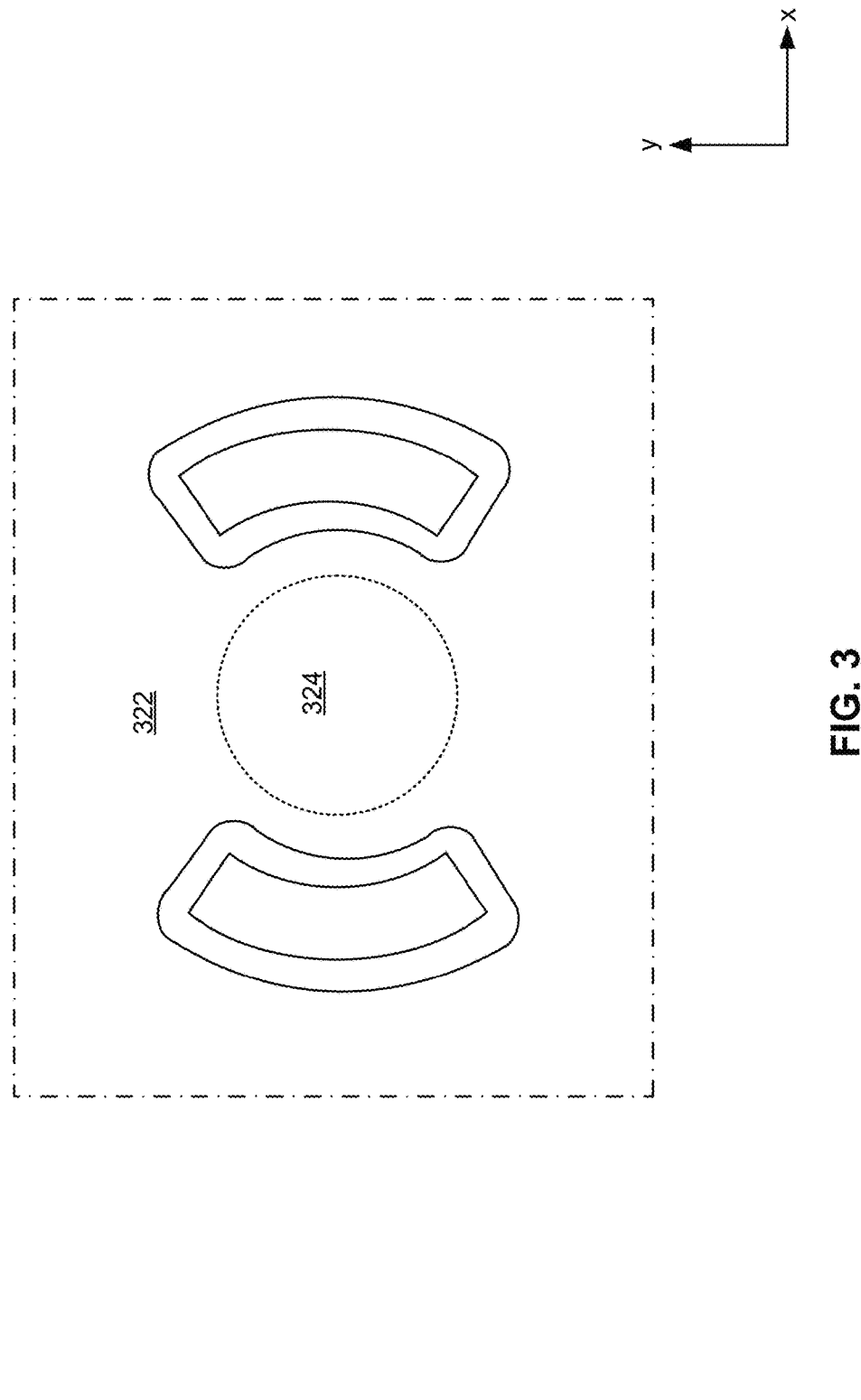
FIG. 3 is a diagram illustrating a top view of an example emitter device.

FIG. 3 is a diagram illustrating a top view of an example emitter device 300. The emitter device 300 may be configured similarly to the emitter device 200. For example, the emitter device 300 may include the first oxidation layer (that includes the first oxidized region and the second oxidized region) and the first set of oxidation trenches, described in connection with FIGS. 2A-2C. However, the emitter device 300 may omit the second oxidation layer (e.g., that provides optical/current confinement) and the second set of oxidation trenches, described in connection with FIGS. 2A-2C. Instead, the emitter device 300 may include an ion implantation region 322 in the epitaxial layers to provide current confinement. As shown, the ion implantation region 322 may surround an un-implanted region 324 associated with the emission region of the emitter device 300, as described above.

As indicated above, FIG. 3 is provided as an example. Other examples may differ from what is described with regard to FIG. 3.

Figure 4:
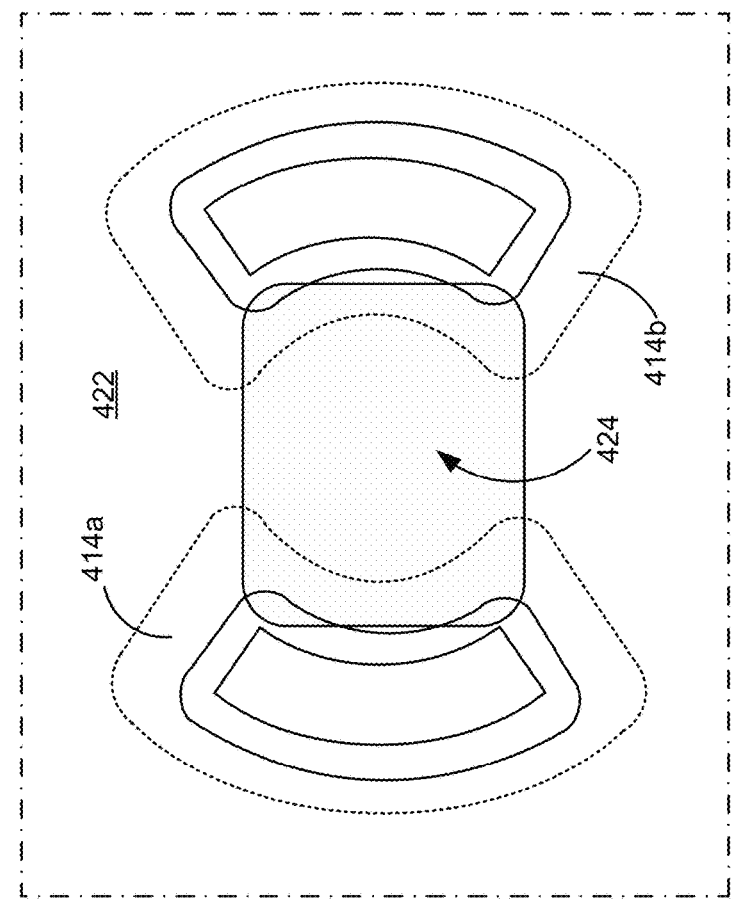
FIG. 4 is a diagram illustrating a top view of an example emitter device.

FIG. 4 is a diagram illustrating a top view of an example emitter device 400. The emitter device 400 may be configured similarly to the emitter device 200. For example, the emitter device 400 may include the first oxidation layer (that includes the first oxidized region and the second oxidized region), the second oxidation layer, and the first set of oxidation trenches, described in connection with FIGS. 2A-2C. However, the emitter device 300 may omit the second set of oxidation trenches, described in connection with FIGS. 2A-2C. Accordingly, the first set of oxidation trenches may oxidize the first oxidation layer, as described in connection with FIGS. 2A-2C, and oxidize the second oxidation layer similarly to the first oxidation layer. For example, the second oxidation layer may include a first oxidized region 414a, a second oxidized region 414b, and an unoxidized region that separates the first oxidized region 414a and the second oxidized region 414b. In this way, the emitter device 400 may have enhanced radially asymmetric strain. The first oxidized region 414a and the second oxidized region 414b may provide optical and current confinement (e.g., primarily in a direction along the x-axis shown). Moreover, the emitter device 400 may include an ion implantation region 422 to provide current confinement (e.g., primarily in a direction along the y-axis shown), and the ion implantation region 422 may surround an un-implanted region 424, in a similar manner as described in connection with FIG. 3.

As indicated above, FIG. 4 is provided as an example. Other examples may differ from what is described with regard to FIG. 4.

While emitter device 200, emitter device 300, and/or emitter device 400 are shown and described in a top-emitting configuration, emitter device 200, emitter device 300, and/or emitter device 400 may be configured in a bottom-emitting configuration (e.g., in which a bottom mirror is less reflective than a top mirror). In some implementations, the emitter device 200, the emitter device 300, and/or the emitter device 400 may include, in addition to the first oxidation layer described herein, features to induce lasing in a single polarization state. For example, the emitter device 200, the emitter device 300, and/or the emitter device 400 may include epitaxial layers grown on an off-axis cut substrate (e.g., that is cut off from a crystalline axis). Additionally, or alternatively, the emitter device 200, the emitter device 300, and/or the emitter device 400 may include an asymmetrical emission region. Additionally, or alternatively, the emitter device 200, the emitter device 300, and/or the emitter device 400 may include a grating (e.g., on a top surface and/or within a DBR pair).

Figure 5:
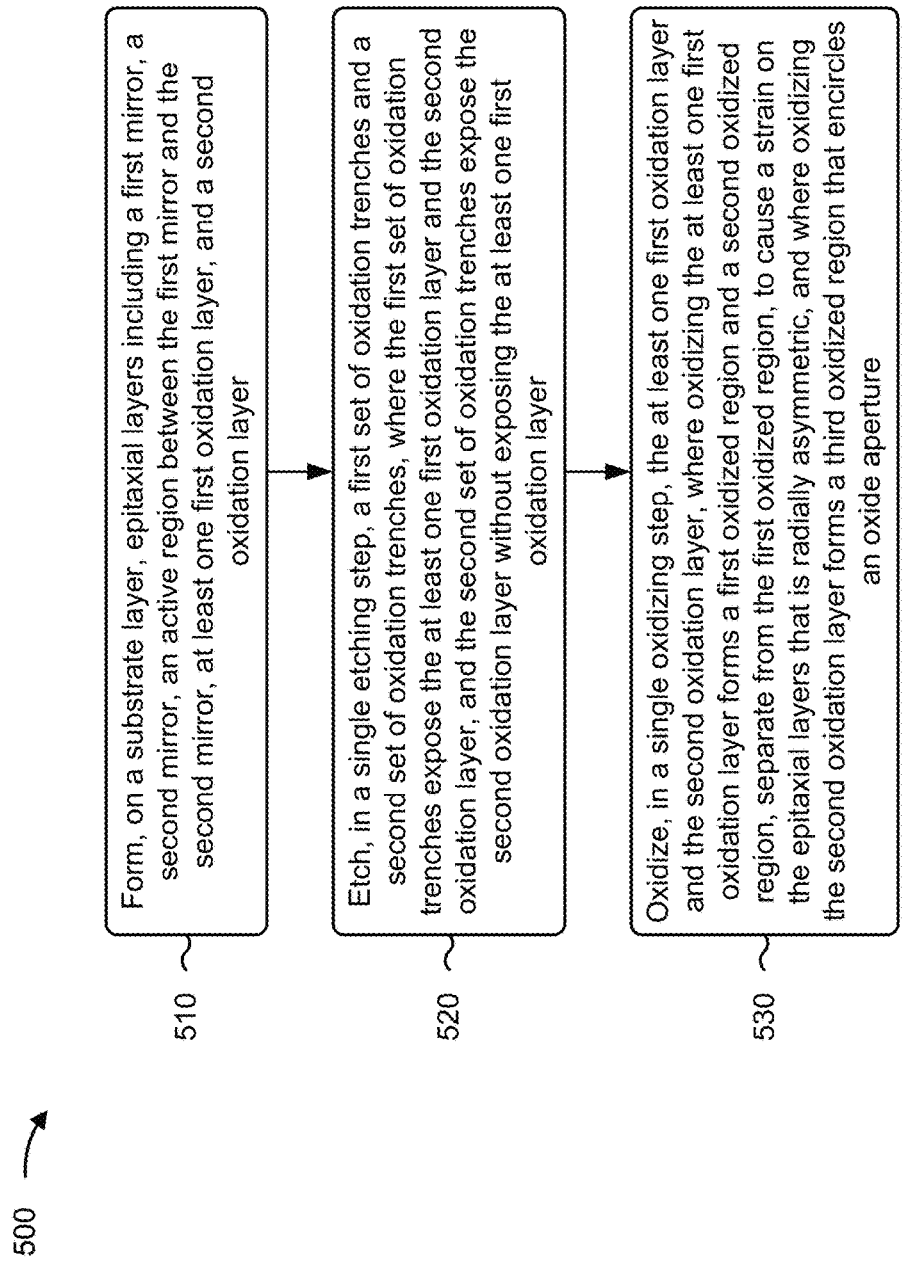
FIG. 5 is a flowchart of an example process relating to fabricating an emitter device.

FIG. 5 is a flowchart of an example process 500 relating to fabricating an emitter device. In some implementations, one or more process blocks of FIG. 5 may be performed by a machine.

As shown in FIG. 5, process 500 may include forming, on a substrate layer, epitaxial layers including a first mirror, a second mirror, an active region between the first mirror and the second mirror, at least one first oxidation layer, and a second oxidation layer (block 510). For example, the epitaxial layers may be similar to the epitaxial layers 204 described in connection with FIGS. 2A-2C.

As further shown in FIG. 5, process 500 may include etching, in a single etching step, a first set of oxidation trenches and a second set of oxidation trenches, where the first set of oxidation trenches expose the at least one first oxidation layer and the second oxidation layer, and the second set of oxidation trenches expose the second oxidation layer without exposing the at least one first oxidation layer (block 520). For example, the first set of oxidation trenches may and the second set of oxidation trenches may be similar to the first set of oxidation trenches 216 and second set of oxidation trenches 218, respectively, described in connection with FIGS. 2A-2C. To etch the first set of oxidation trenches and the second set of oxidation trenches in the single etching step, the first set of oxidation trenches and the second set of oxidation trenches may be etched concurrently during the same etching operation.

As further shown in FIG. 5, process 500 may include oxidizing, in a single oxidizing step, the at least one first oxidation layer and the second oxidation layer, where oxidizing the at least one first oxidation layer forms a first oxidized region and a second oxidized region, separate from the first oxidized region, to cause a strain on the epitaxial layers that is radially asymmetric, and where oxidizing the second oxidation layer forms a third oxidized region that encircles an oxide aperture (block 530). For example, the first oxidized region, the second oxidized region, and the third oxidized region may be similar to the first oxidized region 212a, the second oxidized region 212b, and the oxidized region 214a, respectively, described in connection with FIGS. 2A-2C. To oxidize the at least one first oxidation layer and the second oxidation layer in the single oxidizing step, the at least one first oxidation layer and the second oxidation layer may be oxidized concurrently during the same oxidizing operation.

Process 500 may include additional implementations, such as any single implementation or any combination of implementations described below and/or in connection with one or more other processes described elsewhere herein.

In some implementations, the strain on the epitaxial layers that is radially asymmetric causes the epitaxial layers to be radially asymmetrically bowed.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "top," "bottom" and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A vertical cavity surface emitting laser (VCSEL), comprising:
a substrate layer; and
epitaxial layers on the substrate layer, the epitaxial layers comprising:
a first mirror;
a second mirror;
an active layer between the first mirror and the second mirror;
at least one first oxidation layer comprising a first oxidized region and a second oxidized region separate from the first oxidized region,
wherein the first oxidized region and the second oxidized region are respectively on opposing sides of an emission region of the epitaxial layers to provide a strain on the epitaxial layers that is radially asymmetric;
a second oxidation layer comprising a third oxidized region that encircles an oxide aperture;
a first set of oxidation trenches in the set of epitaxial layers to expose the first oxidation layer and the second oxidation layer; and
a second set of oxidation trenches in the set of epitaxial layers to expose the second oxidation layer without exposing the first oxidation layer,
wherein the first set of oxidation trenches and the second set of oxidation trenches partially surround the emission region, and
wherein one or more of the second set of oxidation trenches are located between one or more of the first set of oxidation trenches.

2. The VCSEL of claim 1, wherein the strain is to induce a particular polarization for light emission of the VCSEL.

3. The VCSEL of claim 1, wherein the first oxidized region and the second oxidized region are located along an axis orthogonal to an emission direction of the VCSEL.

4. The VCSEL of claim 3, wherein the strain is greater along the axis than along another axis that is orthogonal to the axis and the emission direction.

5. The VCSEL of claim 1, wherein the at least one first oxidation layer has a lower aluminum content than an aluminum content of the second oxidation layer.

6. The VCSEL of claim 1, wherein the at least one first oxidation layer has a greater thickness than a thickness of the second oxidation layer.

7. The VCSEL of claim 1, wherein the first set of oxidation trenches have greater widths than widths of the second set of oxidation trenches.

8. The VCSEL of claim 1, wherein the epitaxial layers are radially asymmetrically bowed.

9. The VCSEL of claim 1, wherein the at least one first oxidation layer is in the first mirror and the second oxidation layer is in the second mirror.

10. The VCSEL of claim 1, wherein the second oxidation layer is configured to provide current and optical confinement.

11. An emitter device, comprising:
a substrate layer; and
epitaxial layers on the substrate layer, the epitaxial layers comprising:
a first mirror;
a second mirror;
an active layer between the first mirror and the second mirror;
at least one oxidation layer comprising a first oxidized region and a second oxidized region separate from the first oxidized region,
wherein the first oxidized region and the second oxidized region are configured to provide a strain on the epitaxial layers that is radially asymmetric; and
a set of oxidation trenches in the set of epitaxial layers to expose the at least one oxidation layer, wherein the set of oxidation trenches include:
a first set of oxidation trenches and a second set of oxidation trenches that partially surround an emission region,
wherein one or more of the second set of oxidation trenches are located between one or more of the first set of oxidation trenches.

12. The emitter device of claim 11, wherein the strain is to induce a particular polarization for light emission of the emitter device.

13. The emitter device of claim 11, wherein the first oxidized region and the second oxidized region are located along an axis orthogonal to an emission direction of the emitter device.

14. The emitter device of claim 11, further comprising:
an implantation region in the epitaxial layers configured to provide current confinement.

15. The emitter device of claim 11, further comprising:
an additional oxidation layer comprising a third oxidized region that encircles an oxide aperture.

16. The emitter device of claim 11, wherein the epitaxial layers are radially asymmetrically bowed.

17. The emitter device of claim 11, wherein the at least one oxidation layer is a single oxidation layer having the first oxidized region, the second oxidized region, and an unoxidized region that separates the first oxidized region and the second oxidized region.

18. The emitter device of claim 11, wherein the at least one oxidation layer is multiple oxidation layers respectively having the first oxidized region and the second oxidized region.

19. A method, comprising:
forming, on a substrate layer, epitaxial layers comprising a first mirror, a second mirror, an active region between the first mirror and the second mirror, at least one first oxidation layer, and a second oxidation layer;
etching, in a single etching step, a first set of oxidation trenches and a second set of oxidation trenches,
wherein the first set of oxidation trenches expose the at least one first oxidation layer and the second oxidation layer, and the second set of oxidation trenches expose the second oxidation layer without exposing the at least one first oxidation layer,
wherein the first set of oxidation trenches and the second set of oxidation trenches partially surround an emission region, and
wherein one or more of the second set of oxidation trenches are located between one or more of the first set of oxidation trenches; and
oxidizing, in a single oxidizing step, the at least one first oxidation layer and the second oxidation layer,
wherein oxidizing the at least one first oxidation layer forms a first oxidized region and a second oxidized region, separate from the first oxidized region, to cause a strain on the epitaxial layers that is radially asymmetric, and
wherein oxidizing the second oxidation layer forms a third oxidized region that encircles an oxide aperture.

20. The method of claim 19, wherein the strain on the epitaxial layers that is radially asymmetric causes the epitaxial layers to be radially asymmetrically bowed.

* * * * *